United States Patent
Ito

(10) Patent No.: US 8,565,334 B2
(45) Date of Patent: Oct. 22, 2013

(54) RADIO COMMUNICATION SYSTEM, TERMINAL APPARATUS, BASE STATION APPARATUS, AND RADIO COMMUNICATION METHOD FOR RADIO COMMUNICATION SYSTEM

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/235,560

(22) Filed: Sep. 19, 2011

(65) Prior Publication Data

US 2012/0008699 A1    Jan. 12, 2012

Related U.S. Application Data

(63) Continuation of application No. PCT/JP2009/001297, filed on Mar. 24, 2009.

(51) Int. Cl.
*H04B 7/02* (2006.01)
(52) U.S. Cl.
USPC ......................................................... 375/267
(58) Field of Classification Search
USPC ......................................................... 375/267
See application file for complete search history.

(56) References Cited

U.S. PATENT DOCUMENTS

| | | | | |
|---|---|---|---|---|
| 2008/0232503 | A1* | 9/2008 | Kim | 375/267 |
| 2009/0262695 | A1* | 10/2009 | Chen et al. | 370/329 |
| 2010/0046445 | A1 | 2/2010 | Sawahashi et al. | |
| 2010/0074356 | A1* | 3/2010 | Ashikhmin | 375/267 |
| 2010/0183085 | A1 | 7/2010 | Taoka et al. | |
| 2010/0189191 | A1 | 7/2010 | Taoka et al. | |
| 2010/0202553 | A1* | 8/2010 | Kotecha et al. | 375/267 |
| 2010/0284351 | A1 | 11/2010 | Liang et al. | |
| 2011/0244905 | A1* | 10/2011 | Burstrom et al. | 455/507 |

FOREIGN PATENT DOCUMENTS

| | | |
|---|---|---|
| EP | 1 690 361 | 6/2005 |
| JP | 2007-513554 | 5/2007 |
| JP | 2008-092374 | 4/2008 |
| JP | 2009-303106 | 12/2009 |
| WO | 2008/023646 | 2/2008 |
| WO | 2008/156067 | 12/2008 |
| WO | 2008/156081 | 12/2008 |
| WO | 2009/033358 | 3/2009 |

OTHER PUBLICATIONS

International Search Report issued for corresponding international patent application No. PCT/JP2009/001297, mailed Apr. 28, 2009.
Samsung; "SU-MIMO PMI feedback and Compression", 3GPP TSG RAN WG1 Meeting #53, R1-081744. Dated May 5, 2008; [Ref.: ISR mailed Apr. 28, 2009].

(Continued)

*Primary Examiner* — Don N Vo
(74) *Attorney, Agent, or Firm* — Myers Wolin, LLC

(57) ABSTRACT

A radio communication system including: a base station apparatus; and a terminal apparatus, wherein the base station apparatus and terminal apparatus perform radio communication, the terminal apparatus includes: a holding unit which holds a pre-coding matrix; a relative value determining unit which determines a relative value with respect to a parameter included in the held pre-coding matrix; and a transmitting unit which transmits the determined relative value, and the base station apparatus includes a receiving unit which receives the relative value.

19 Claims, 16 Drawing Sheets

RADIO COMMUNICATION SYSTEM_1

(56) References Cited

OTHER PUBLICATIONS

Nortel; "Differential PMI feedback", 3GPP TSG-RAN WG1 Meeting #53, R1-081835. Dated May 5, 2008; [Ref.: ISR mailed Apr. 28, 2009].
3GPP TS 36.211 V8.4.0; 3rd Generation Partnership Project; Technical Specification Group Radio Access Network; Evolved Universal Terrestrial Radio Access (E-UTRA); "Physical Channels and Modulation (Release 8)"; Sep. 2008.
Notification of Reason for Rejection issued for corresponding Japanese Patent Application No. 2011-505650, dispatched Dec. 18, 2012, with English translation.
Notice of Preliminary Rejection issued for corresponding Korean Patent Application No. 10-2011-7022374, mailed Oct. 17, 2012, with English translation.
Abe et al.; "Differential Codebook MIMO Precoding Technique"; IEEE Communications Society 2007.
Japanese Office Action issued for corresponding Japanese Patent Application No. 2011-505650, dispatched Mar. 19, 2013 with English translation.
First Notification of Office Action issued for corresponding Chinese Patent Application No. 200980158246.9, issued on Aug. 5, 2013 with an English translation.

\* cited by examiner

"RELATED ART"

"RELATED ART"

FIG. 15

DATA TRANSMITTED FROM EACH TRANSMITTING ANTENNA → PRE-CODING MATRIX → TRANSMITTING DATA STRING $$\begin{pmatrix} Tx1 \\ Tx2 \\ Tx3 \\ Tx4 \end{pmatrix} = \begin{pmatrix} a & e \\ b & f \\ c & g \\ d & h \end{pmatrix} \cdot \begin{pmatrix} data1 \\ data2 \end{pmatrix}$$

"RELATED ART"

FIG. 16

| Codebook index | Number of layers $\upsilon$ | |
| --- | --- | --- |
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |

"RELATED ART"
FIG. 17

| Codebook index | $u_n$ | Number of layers $\upsilon$ | | | |
|---|---|---|---|---|---|
| | | 1 | 2 | 3 | 4 |
| 0 | $u_0 = [1 \ -1 \ -1 \ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1 \ -j \ 1 \ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1 \ 1 \ -1 \ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1 \ j \ 1 \ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1 \ (-1-j)/\sqrt{2} \ -j \ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1 \ (1-j)/\sqrt{2} \ j \ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1 \ (1+j)/\sqrt{2} \ -j \ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1 \ (-1+j)/\sqrt{2} \ j \ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1 \ -1 \ 1 \ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1 \ -j \ -1 \ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1 \ 1 \ 1 \ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1 \ j \ -1 \ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1 \ -1 \ -1 \ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1 \ -1 \ 1 \ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1 \ 1 \ -1 \ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1 \ 1 \ 1 \ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

RADIO COMMUNICATION SYSTEM, TERMINAL APPARATUS, BASE STATION APPARATUS, AND RADIO COMMUNICATION METHOD FOR RADIO COMMUNICATION SYSTEM

CROSS-REFERENCE TO RELATED APPLICATIONS

This application is a continuation of international application PCT/JP2009/001297, filed on Mar. 24, 2009, now pending, herein incorporated by reference.

TECHNICAL FIELD

The embodiments discussed herein are related to a radio communication system, a terminal apparatus, a base station apparatus, and a radio communication method for the radio communication system.

BACKGROUND ART

In a radio communication system such as LTE (Long Term Evolution), an MIMO (Multi Input Multi Output) system is standardized (e.g. Non-patent Literature 1).

In the MIMO system, a base station apparatus maps a transmitting data string to a plurality of antennas and transmits the data. The transmitting data string is received by a terminal apparatus via the same number of propagation paths as (the number of transmitting antennas×the number of receiving antennas). In this case, the base station apparatus maps the data using a pre-coding matrix.

FIG. 15 illustrates an example of a pre-coding matrix. In a pre-coding matrix, the number of rows indicates the number of transmitting antennas, and the number of columns indicates the number of transmitting data (also called "streams"). The example in FIG. 15 indicates that two transmitting data strings are mapped to four transmitting antennas and transmitted.

A pre-coding matrix used for a base station apparatus and a terminal apparatus is limited to one in a code book. FIG. 16 and FIG. 17 are examples of a code book. FIG. 16 is an example of a code book in the case of two transmitting antennas, and FIG. 17 is the case of four transmitting antennas. In FIG. 16 and FIG. 17, "Codebook Index" indicates a code book number, and "Number of layers v" indicates number of transmitting data strings. The terminal apparatus selects a pre-coding matrix corresponding to the number of transmitting antennas and the number of transmitting data strings, and transmits a "Codebook Index" corresponding to the selected pre-coding matrix to the base station as a PMI (Pre-coding Matrix Indicator).

It is preferable that the pre-coding matrix is selected from the code book so that better throughput characteristics can be obtained on the propagation path. Therefore the terminal apparatus measures the propagation path (channel estimation), and selects a pre-coding matrix based on the result. The base station apparatus determines a pre-coding matrix based on the PMI, and maps the data string to each transmitting antenna, and transmits the data.

On the other hand, the number of streams of the transmitting data transmitted from the base station apparatus can be adaptively changed according to the environment of the propagation path. This technique is called "rank adaptation", and is used for such a system as LTE (e.g. see Non-patent Document 1). Non-patent Document 1: 3GPP TS 36.211 V8.4

DISCLOSURE OF THE INVENTION

Problems to be Solved by the Invention

In the case of transmitting a code book number, however, if the number of pre-coding matrices included in the code book is high, the number of transmitting bits of PMI which the terminal apparatus transmits increases, and frequency utilization efficiency in the uplink direction decreases.

Furthermore, the terminal apparatus selects finite pre-coding matrices from the code book, so a highly accurate pre-coding matrix according to the result of the propagation path measurement cannot be selected. The base station apparatus determines a pre-coding matrix based on the PMI, and maps the transmitting data string to each transmitting antenna, hence the throughput characteristics in the downlink direction deteriorate.

Means for Solving the Problem

According to an aspect of the invention, a radio communication system including: a base station apparatus; and a terminal apparatus, wherein the base station apparatus and terminal apparatus perform radio communication, the terminal apparatus includes: a holding unit which holds a pre-coding matrix; a relative value determining unit which determines a relative value with respect to a parameter included in the held pre-coding matrix; and a transmitting unit which transmits the determined relative value, and the base station apparatus includes a receiving unit which receives the relative value.

Furthermore, according to an another aspect of the invention, a base station apparatus for performing radio communication with a terminal apparatus, the base station apparatus including: a receiving unit which receives from the terminal apparatus a relative value with respect to a parameter included in a pre-coding matrix held in the terminal apparatus.

Furthermore, according to an another aspect of the invention, a terminal apparatus for performing radio communication with a base station apparatus, the terminal apparatus including: a holding unit which holds a pre-coding matrix; a relative value determining unit which determines a relative value with respect to a parameter included in the hold pre-coding matrix; and a transmitting unit which transmits the determined relative value to the base station apparatus.

Furthermore, according to an another aspect of the invention, a radio communication method in a radio communication system for performing radio communication between a base station apparatus and a terminal apparatus, the method including: determining by the terminal apparatus a relative value with respect to a parameter included in the pre-coding matrix held in a holding unit of the terminal apparatus, and transmitting the determined relative value; and receiving by the base station apparatus the relative value.

Effectiveness of the Invention

A radio communication system, a terminal apparatus, a base station apparatus and a radio communication method for the radio communication system, whereby frequency utilization efficiency is improved, can be provided. A radio communication system and the like, whereby the throughput characteristics are improved, can also be provided.

BRIEF DESCRIPTION OF THE DRAWINGS

FIG. 15 is an example of a pre-coding matrix;

FIG. 16 is an example of a code book of two transmitting antennas; and

FIG. 17 is an example of a code book of four transmitting antennas.

1: radio communication system, 10(10-1, 10-2): base station apparatus, 11-1~11-n: transmitting antenna, 12: transmitting unit, 13: PMI receiving unit, 14: pre-coding matrix holding unit, 15: absolute PMI converting unit, 16: pre-coding matrix determining unit, 17: control signal transmitting unit, 18: data transmitting unit, 19: speed information receiving unit, 20(20-1~20-3): terminal apparatus, 21-1~21-m: receiving antenna, 22: pilot receiving unit, 23: channel estimating unit, 24: pre-coding matrix holding unit, 25: relative PMI determining unit, 26: PMI transmitting unit, 27: control signal receiving unit, 28: data receiving unit, 29: speed detecting unit, 101: receiving unit, 201: holding unit, 202: relative value determining unit, 203: transmitting unit, 204: receiving unit

BEST MODE FOR CARRYING OUT THE INVENTION

Embodiments of the present invention will now be described.

First Embodiment

Figure 1:
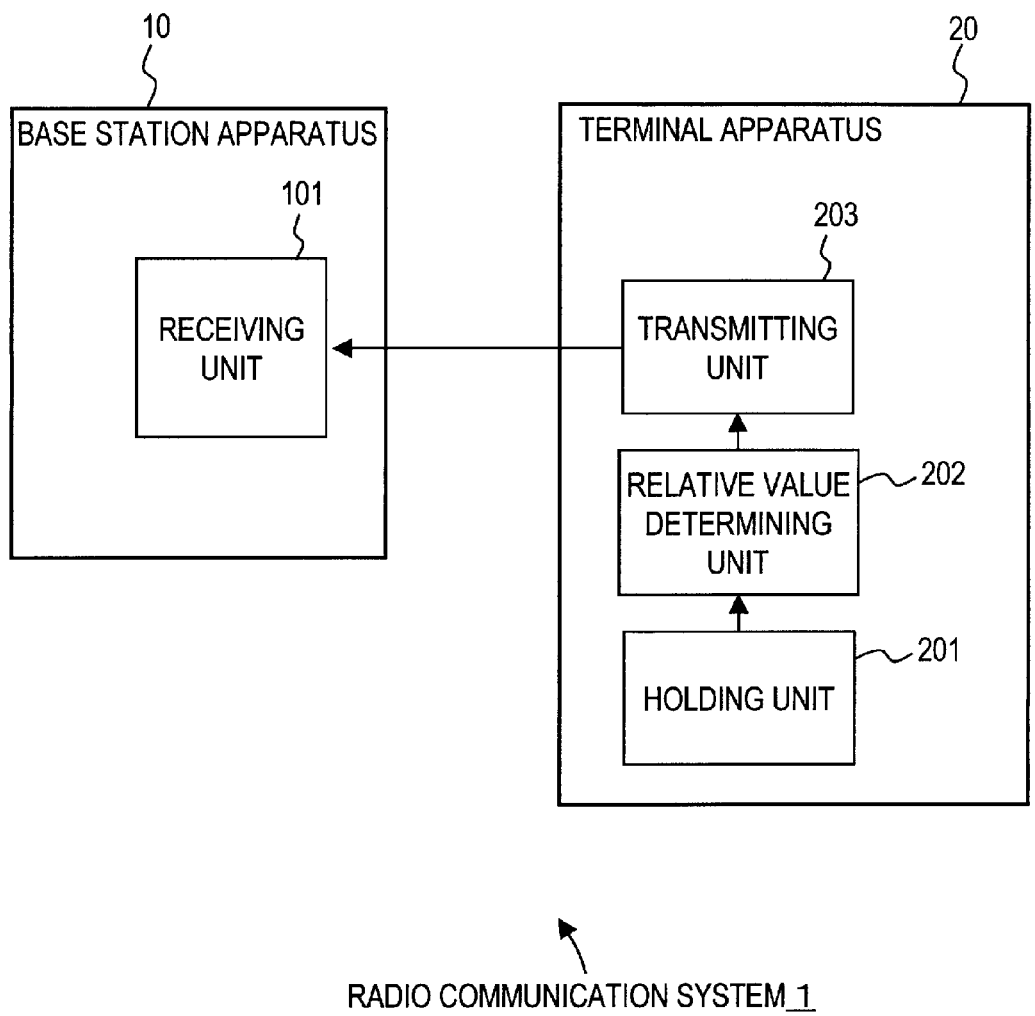
FIG. 1 illustrates a configuration example of a radio communication system.

A first embodiment will now be described. FIG. 1 illustrates a configuration example of a radio communication system 1.

In a radio communication system 1 which performs radio communication between a base station apparatus 10 and a terminal apparatus 20, the terminal apparatus 20 includes a holding unit 201 which holds a pre-coding matrix, a relative value determining unit 202 which determines a relative value with respect to a parameter included in the held pre-coding matrix, and a transmitting unit 203 which transmits the determined relative value, and the base station apparatus 10 includes a receiving unit 101 which receives the relative value.

The holding unit 201 holds a pre-coding matrix, and the relative value determining unit 202 determines a relative value with respect to a parameter included in the pre-coding matrix. The transmitting unit 203 transmits the determined relative value to the base station apparatus 10. The receiving unit 101 of the base station apparatus 10 receives the transmitted relative value.

The transmitting unit 203 transmits a relative value with respect to a parameter included in the pre-coding matrix, hence an information volume is smaller than the case when a "Codebook Index" corresponding to each pre-coding matrix is transmitted. Therefore more frequency resources can be assigned to the transmission of other data for the amount of decrease of information volume, and frequency utilization efficiency can be improved.

Second Embodiment

Figure 2:
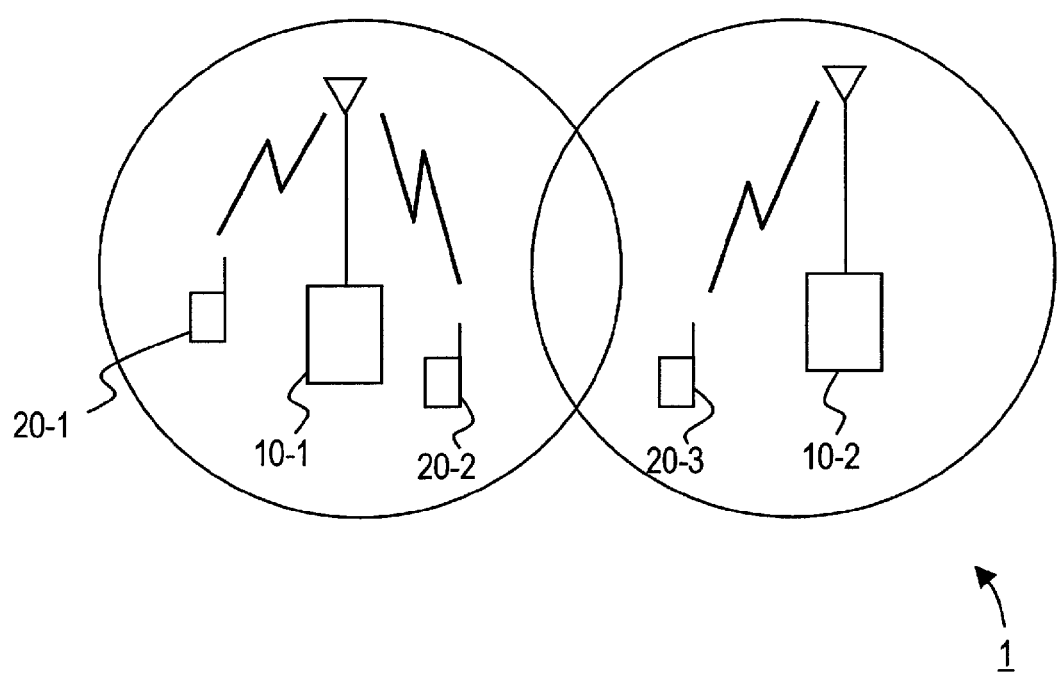
FIG. 2 illustrates another configuration example of a radio communication system.

FIG. 2 illustrates a configuration example of a radio communication system 1. The radio communication system 1 includes base station apparatuses (hereafter "base stations") 10-1 and 10-2, and terminal apparatuses (hereafter "terminals") 20-1 to 20-3. Each terminal 20-1 to 20-3 is wirelessly connected with each base station 10-1 and 10-2 in a connectable area (indicated by a circle in FIG. 2), and can perform radio communication.

Figure 3:
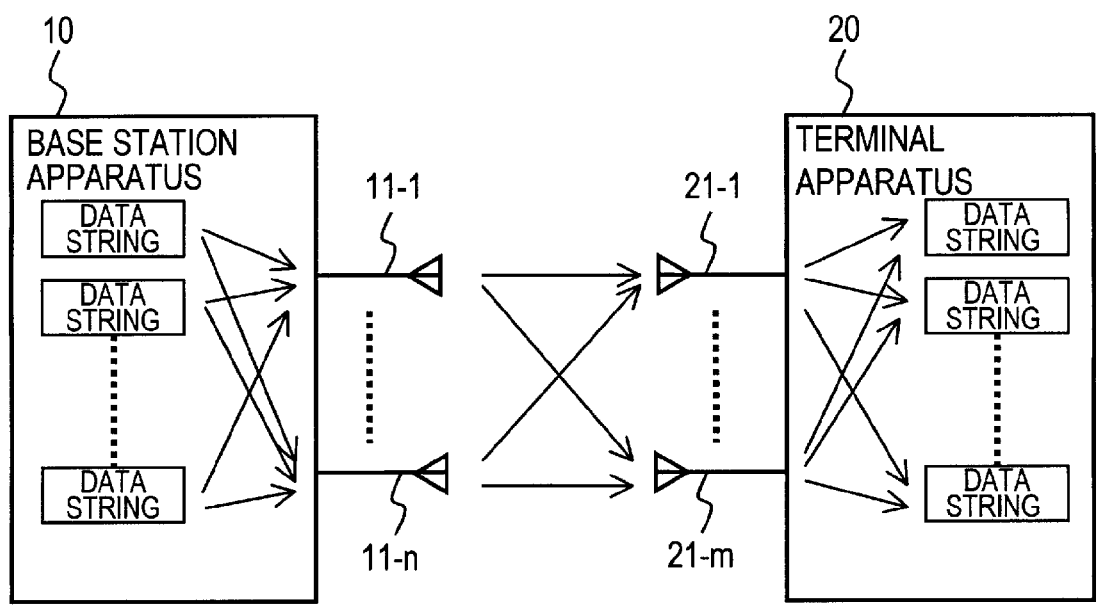
FIG. 3 illustrates an example of mapping.

FIG. 3 illustrates an example of the mapping of data strings in the base station 10 and the terminal 20. The base station 10 includes a plurality of transmitting antennas 11-1 to 11-n (n=2, 3, . . . ), and the terminal 20 includes a plurality of receiving antennas 21-1 to 21-m (m=2, 3, . . . ).

The base station 10 maps the transmitting data strings to the plurality of antennas 11-1 to 11-n respectively, and the terminal 20 receives data by a plurality of receiving antennas 21-1 to 21-m via (the number of transmitting antennas×the number of receiving antennas) of the propagation paths. The terminal 20 restores the original data strings from the data received by the plurality of receiving antennas 21-1 to 21-m, and performs receiving processing. The number of receiving antennas 21-1 to 21-m of the terminal 20 may be one.

Figure 4:
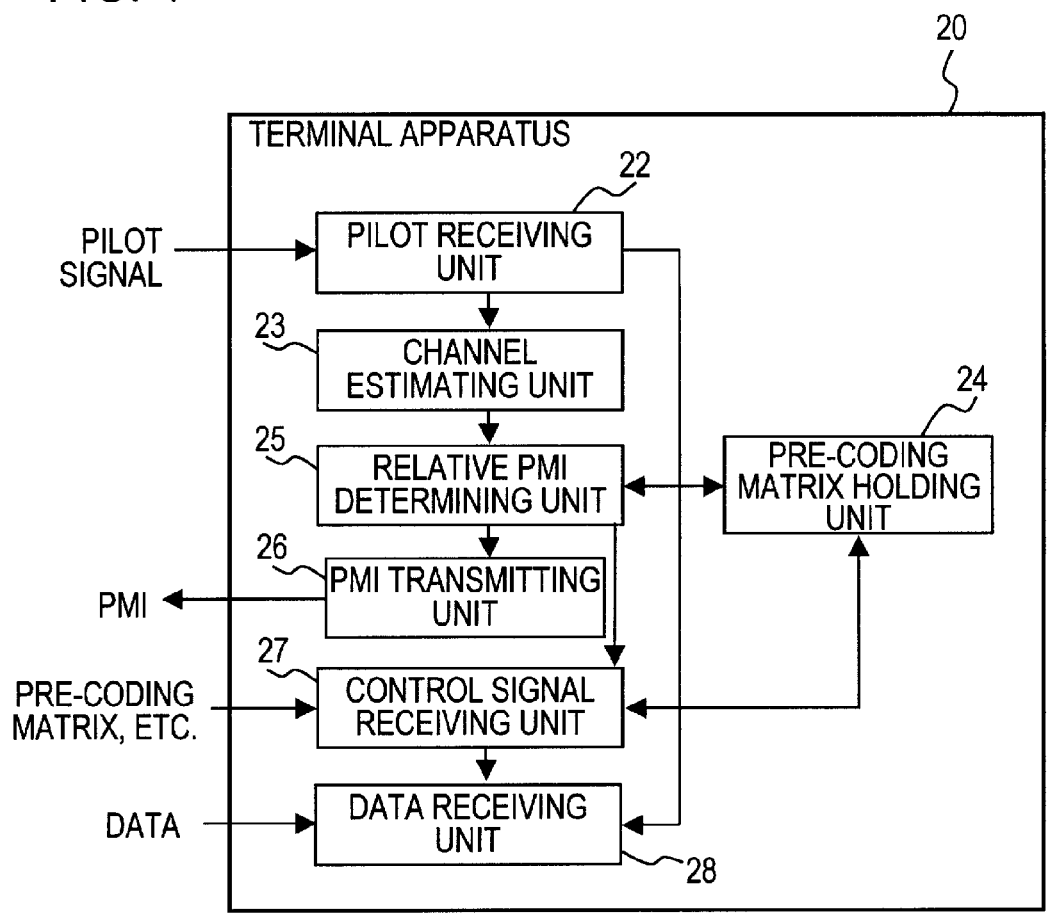
FIG. 4 illustrates a configuration example of a terminal apparatus.

FIG. 4 illustrates a configuration example of the terminal 20. The terminal 20 includes a pilot receiving unit 22, a channel estimating unit 23, a pre-coding matrix holding unit (hereafter "matrix holding unit") 24, a relative PMI determining unit 25, a PMI transmitting unit 26, a control signal receiving unit 27, and a data receiving unit 28.

The holding unit 201 in the first embodiment corresponds to the matrix holding unit 24, for example, the relative value determining unit 202 corresponds to the relative PMI determining unit 25, for example, and the transmitting unit 203 corresponds to the PMI transmitting unit 26, for example.

The pilot receiving unit 22 receives a pilot signal (or a known signal) transmitted from the base station 10, and transmits it to the channel estimating unit 23.

The channel estimating unit 23 estimates a channel based on the pilot signal. For example, the channel estimating unit 23 measures the SNR (Signal-to-Noise Ratio) or the SINR (Signal-to-Interference-plus-Noise Ratio) of the pilot signal. For example, the channel estimating unit 23 determines a channel estimating value of each receiving antenna 21-1 to 21-m for each transmitting antenna 11-1 to 11-n, and adds each result, so as to determine (the number of receiving antennas×the number of transmitting antennas) of channel estimating values.

The matrix holding unit 24 holds a pre-coding matrix. A pre-coding matrix which is held is represented by a mathematical expression including parameters. Details will be described later.

The relative PMI determining unit 25 determines the PMI value for the pre-coding matrix held in the matrix holding unit 24 based on the channel estimating value from the channel estimating unit 23. The relative PMI determining unit 25 determines a direction (plus or minus (up or down)) of moving the parameter for a predetermined width, for the pre-coding matrix held in the matrix holding unit 24. The PMI value is this value of the moving direction. The relative PMI determining unit 25 determines a relative value with respect to the parameter of the pre-coding matrix as the PMI value.

In this embodiment, the terminal apparatus 20 selects a pre-coding matrix by this parameter adjustment, hence a highly accurate pre-coding matrix matching the propagation path environment can be selected compared with the case of the code book.

After determining the relative value, the relative PMI determining unit 25 moves the parameter of the pre-coding matrix held in the matrix holding unit 24 for the amount of the relative value, so as to update the pre-coding matrix being held. The relative PMI determining unit 25 uses the updated pre-coding matrix when the relative value is determined the next time.

The PMI transmitting unit 26 transmits the PMI value to the base station 10.

The control signal receiving unit 27 receives a control signal transmitted from the base station 10. A control signal includes a pre-coding information which the base station 10 determined for the PMI value transmitted by the terminal 20. This pre-coding information is also indicated by a relative value.

The control signal receiving unit 27 checks whether the relative value received from the base station 10 and the relative value determined by the relative PMI determining unit 25 match, and reads the updated pre-coding matrix from the pre-coding holding unit 24, and outputs it to the data receiving unit 28 if there is a match. If there is no match, the control signal receiving unit 27 adjusts the parameter, and details thereof will be described later.

The data receiving unit 28 receives data transmitted from the base station 10 based on the pre-coding matrix from the control signal receiving unit 27.

If there is no change in a parameter for the pre-coding matrix held by the matrix holding unit 24, the relative PMI determining unit 25 may set such that the PMI transmitting unit 26 does not transmit the PMI without determining a relative value. If the PMI arrives as a relative value, the base station 10 changes or updates the pre-coding matrix that is held by this base station 10, and if the PMI does not arrive, this station uses the pre-coding matrix that is held without any modification.

Figure 5:
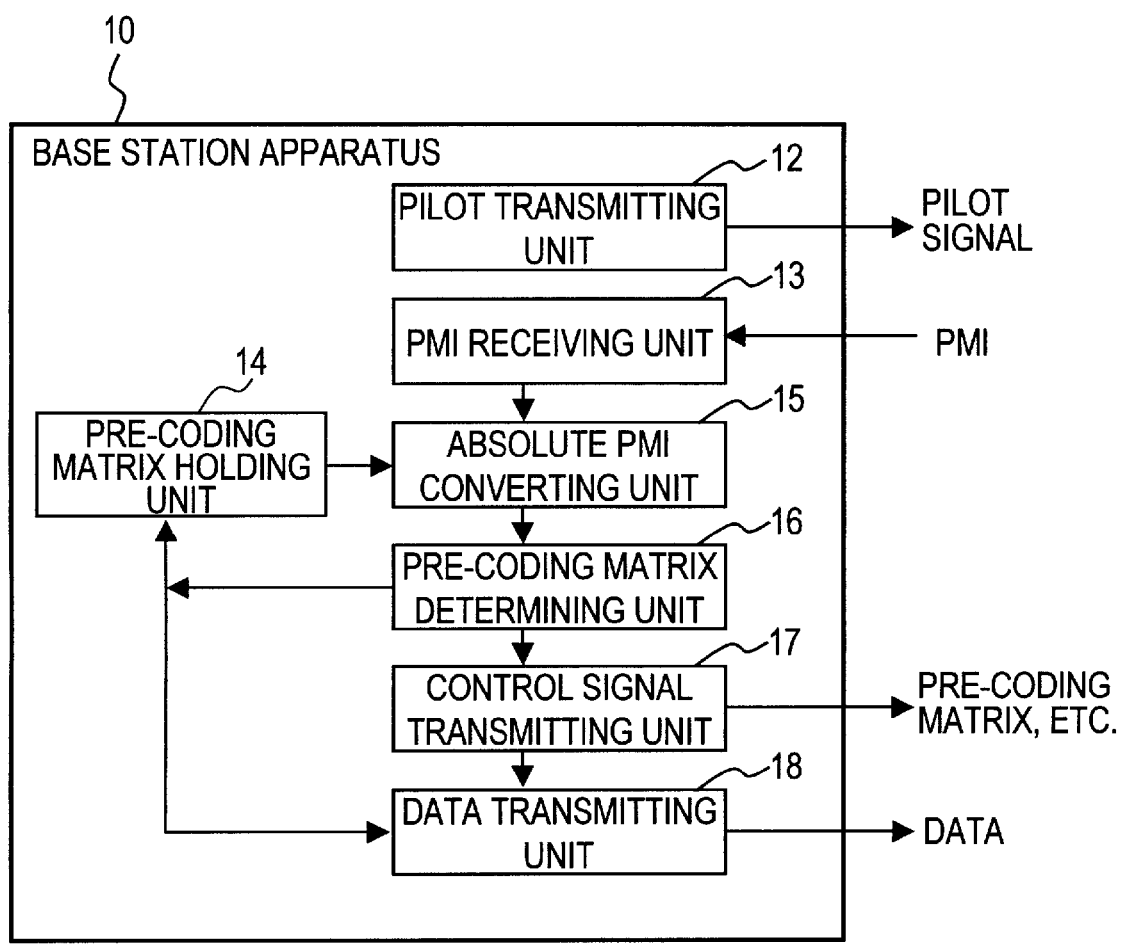
FIG. 5 illustrates a configuration example of a base station.

FIG. 5 illustrates a configuration example of the base station 10. The base station 10 includes a pilot transmitting unit 12, a PMI receiving unit 13, a pre-coding matrix holding unit (hereafter "matrix holding unit") 14, an absolute PMI converting unit 15, a pre-coding matrix determining unit (hereafter "matrix determining unit") 16, a control signal transmitting unit 17, and a data transmitting unit 18. The receiving unit 101 in the first embodiment corresponds to the PMI receiving unit 13, for example.

The pilot transmitting unit 12 transmits a pilot signal to the terminal 20.

The PMI receiving unit 13 receives the PMI (relative value) transmitted from the terminal 20, and outputs it to the absolute PMI converting unit 15.

The matrix holding unit 14 holds a pre-coding matrix represented by a mathematical expression including parameters, just like the pre-coding matrix held by the matrix holding unit 24 of the terminal 20.

The absolute PMI converting unit 15 moves a parameter for a predetermined width from the pre-coding matrix held in the matrix holding unit 14 in a direction indicated by a relative unit, so as to determine a new pre-coding matrix.

The matrix determining unit 16 determines the new pre-coding matrix, which is output from the absolute PMI converting unit 15, as a pre-coding matrix used for transmitting data. The matrix determining unit 16 may determine a pre-coding matrix that is different from the new pre-coding matrix as the matrix used for transmitting data. For example, the matrix determining unit 16 may determine a new pre-coding matrix from the CQI transmitted from the terminal 20.

The determined pre-coding matrix is output to the matrix holding unit 14, and the pre-coding matrix being held is updated to the new pre-coding matrix.

The control signal transmitting unit 17 creates pre-coding information which indicates what kind of pre-coding matrix is determined by the matrix determining unit 16, and includes the pre-coding information in the control signal, and transmits it to the terminal 20. As mentioned above, the pre-coding information is indicated by a relative value.

The pre-coding information transmitted by the base station 10 is often the same as the relative value transmitted by the terminal 20, and in this case, the base station 10 does not transmit the pre-coding information. However, the relative value transmitted by the terminal 20 does not include such an error correction code as CRC (Cyclic Redundancy Check) code in many cases, since the number of transmitting bits is small, hence the base station 10 may includes an erroneous reception. The control signal transmitted by the base station 10, on the other hand, includes the number of bits of the data channel and resource assignment information, and therefore CRC is often attached, and the terminal 20 can check for transmission errors by comparing the CRC with the transmitted relative value. As a consequence, a mismatch of pre-coding matrix used by the base station 10 and the pre-coding matrix used by the terminal 20 can be prevented by the base station 10 transmitting the pre-coding information.

The data transmitting unit 18 maps the data strings to each transmitting antenna 11-1 to 11-*n* using the new pre-coding matrix held in the matrix holding unit 14, and transmits the data to the terminal 20.

Figure 6:
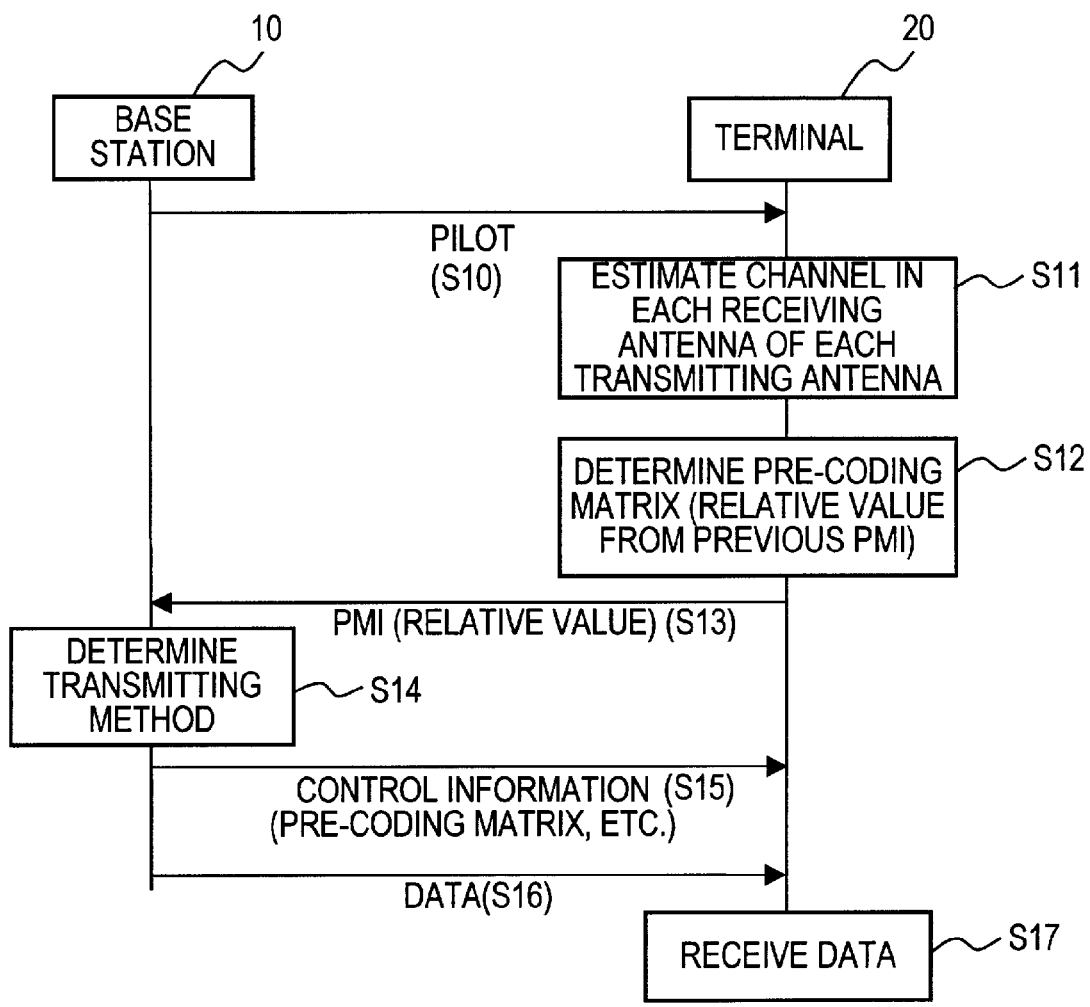
FIG. 6 is a sequence diagram illustrating an operation example in the radio communication system.

FIG. 6 is a sequence diagram illustrating an operation example of the radio communication system 1. First the pilot transmitting unit 12 of the base station 10 transmits a pilot signal (S10). The pilot receiving unit 22 of the terminal 20 receives this pilot signal, and the channel estimating unit 23 estimates the channels (S11).

Then the relative PMI determining unit 25 determines a pre-coding matrix by determining a relative value as a PMI (S12).

Then the PMI transmitting unit 26 transmits the PMI to the base station 10 (S13).

Then the PMI receiving unit 13 of the base station 10 receives the PMI, and the matrix determining unit 16 determines a pre-coding matrix (S14).

Then the control signal transmitting unit 17 of the base station 10 transmits a control signal including the pre-coding information (S15), and maps the data strings to each transmitting antenna 11-1 to 11-*n* based on the determined pre-coding matrix, and transmits the data (S16).

Then the data receiving unit 28 of the terminal 20 receives the data using the pre-coding matrix held (updated) in the matrix holding unit 24 (S17).

For example, at the point of S14, the parameter of the pre-coding matrix held in the matrix holding unit 14 of the base station 10 and the parameter of the pre-coding matrix held in the matrix holding unit 24 of the terminal 20 match.

However in the case of the base station 10 receiving a relative value in error, for example, the parameters may not match and the base station 10 may send a relative value which is different from the relative value transmitted by the terminal 20. In this case, the terminal 20 can adjust the parameter so as to solve the mismatch of the parameters.

For example, if the terminal 20 transmits a relative value of "+1" and the base station 10 transmits a relative value of "−1", the matrix holding unit 24 of the terminal 20 holds a pre-coding matrix where the parameter is moved by "+1", which is shifted "−2" from "−1". Therefore the terminal 20 receives data using the pre-coding matrix where the parameter is moved "−2" from "+1". This processing is performed by the control signal receiving unit 27, for example, and data can be received using the pre-coding matrix after the parameter adjustment by outputting the adjusted pre-coding matrix to the data receiving unit 28.

Examples of a pre-coding matrix will now be described. Two examples are represented below.

$$\begin{pmatrix} \cos\theta & \sin\theta \\ \exp(i\alpha)\sin\theta & -\exp(i\alpha)\cos\theta \end{pmatrix} \quad \text{[Expression 1]}$$

$$\begin{pmatrix} 1 & 1 \\ \exp(i\alpha) & -\exp(i\alpha) \end{pmatrix} \quad \text{[Expression 2]}$$

A pre-coding matrix is a matrix of the number of transmitting antennas×the number of streams (=the number of receiving antennas of the terminal 20). The matrices given by Expression 1 and Expression 2 can be used for the two transmitting antennas and two streams. As Expression 1 and Expression 2 represent, there are two parameters, θ and α, in this example. In this case, the relative PMI determining unit 25 determines a relative value respectively for θ and α, with respect to the pre-coding matrix held in the matrix holding unit 24, and regards the relative value as the PMI. When the two parameters are transmitted, the PMI transmitting unit 26 predetermines the transmitting timings in advance, and transmits the relative value of θ in the case of the even sub-frame, and transmits the relative value of α in the case of an odd sub-frame. The base station 10 receives these relative values at each timing, and determines a pre-coding matrix.

For a pre-coding matrix used for MIMO, it is preferable to use a unitary matrix, and all 2×2 unitary matrices can be expressed using the pre-coding matrix given by Expression 1.

By the terminal 20 and the base station 10 using the pre-coding matrix given by Expression 2, on the other hand, the transmitting power among the transmitting antennas 11-1 to 11-$n$ ($n$=2 in this case) of the base station 10 can be equalized. If the transmitting power is equal between each transmitting antenna 11-1 and 11-2, the maximum power of each transmitting antenna 11-1 and 11-2 becomes ½ of the predetermined power of the base station 10. In this case, an amplifier or the like of each transmitting antenna 11-1 and 11-2 can be designed at low cost, and power consumption can be suppressed. In the case of the pre-coding matrix given by Expression 2, which includes one parameter, the number of transmitting bits can be decreased compared with the case of Expression 1. Both Expression 1 and Expression 2 can be implemented by using the left column of each matrix, in the case of two transmitting antennas and one stream.

In order to improve the throughput characteristics according to the propagation environment between the base station 10 and the terminal 20, a technique called "rank adaptation" which changes the number of streams adaptively, is available. To use this technique, a pre-coding matrix is changed from 2×1 to 2×2 or vice versa. As Expression 1 and Expression 2 represent, the parameters do not change even if the number of columns change. Hence even if rank adaptation is used, the pre-coding matrix given by an expression including parameters can be directly used. For example, the relative PMI determining unit 25 of the terminal 20 and the matrix determining unit 16 of the base station 10 can execute rank adaptation with changing the number of columns for the pre-coding matrices given by Expression 1 and Expression 2 (pre-coding matrices held in the matrix holding units 24 and 14).

In the case of two streams, an optimum pre-coding matrix is, for example, a matrix of which column vector is a singular vector obtained by singular value decomposition of the channel matrix. In other words, the optimum pre-coding matrix is a pre-coding matrix in which a singular vector having the greatest singular value on the left column. By using a pre-coding matrix in which θ and α are adjusted so that a column vector having a larger singular value is sequentially disposed from the left column, the base station 10 and the terminal 20 can transmit/receive data with good throughput characteristics even if two streams are changed to one stream.

The pre-coding matrices represented below are matrices in the case of three transmitting antennas and three streams.

$$\begin{pmatrix} 1 & 1 & 1 \\ \exp(i\alpha) & \exp(i(\alpha+2/3\pi)) & \exp(i(\alpha+4/3\pi)) \\ \exp(i\beta) & \exp(i(\beta+4/3\pi)) & \exp(i(\beta+2/3\pi)) \end{pmatrix} \quad \text{[Expression 3]}$$

$$\begin{pmatrix} 1 & 1 & 1 \\ \exp(i\alpha) & \exp(i(\alpha+4/3\pi)) & \exp(i(\alpha+2/3\pi)) \\ \exp(i\beta) & \exp(i(\beta+2/3\pi)) & \exp(i(\beta+4/3\pi)) \end{pmatrix} \quad \text{[Expression 4]}$$

Both Expression 3 and Expression 4 are cases where the power values among the transmitting antennas 11-1 to 11-3 are equal. By a set of these two matrices, out of the 3×3 unitary matrix all the transmitting antennas that have equal transmitting power with respect to the transmitting antennas 11-1 to 11-3 can be represented. When the terminal 20 or the base station 10 selects a set of two matrices, information on the selected matrix is required in addition to the parameters in the matrix, and [this information] can be included in the PMI, for example. This information is included in the PMI by the relative PMI determining unit 25 of the terminal 20, for example.

The following Expression 5 and Expression 6 are examples of a pre-coding matrix using four transmitting antennas. Both Expression 4 and Expression 5 are examples when the transmitting power of each transmitting antenna 11-1 to 11-4 is constant.

$$\begin{pmatrix} 1 \\ \exp(i\alpha) \\ \exp(i\beta) \\ \exp(i\gamma) \end{pmatrix}$$ [Expression 5]

$$\begin{pmatrix} 1 \\ 1 \\ -1 \\ -1 \end{pmatrix} \begin{pmatrix} 1 \\ -1 \\ 1 \\ -1 \end{pmatrix} \begin{pmatrix} 1 \\ -1 \\ -1 \\ 1 \end{pmatrix} \begin{pmatrix} 1 \\ i \\ -1 \\ -i \end{pmatrix} \begin{pmatrix} 1 \\ i \\ -i \\ -1 \end{pmatrix} \begin{pmatrix} 1 \\ -1 \\ i \\ -i \end{pmatrix} \begin{pmatrix} 1 \\ -1 \\ -i \\ i \end{pmatrix} \begin{pmatrix} 1 \\ -i \\ i \\ -1 \end{pmatrix} \begin{pmatrix} 1 \\ -i \\ -1 \\ i \end{pmatrix}$$ [Expression 6]

In the case of one stream, the terminal 20 and the base station 10 directly use the matrix of Expression 5 as the pre-coding matrix. In the case of two streams, the terminal 20 and the base station 10 select one of Expression 5 and the nine types of determinants of Expression 6, and use a pre-coding matrix constituted by two determinants. For example, the relative PMI determining unit 25 of the terminal 20 selects one out of Expression 6, and includes the selected information in the PMI, and transmits it to the base station 10. In this case, the matrix determining unit 16 of the base station 10 determines a pre-coding matrix based on a relative value of a parameter included in the PMI and the selected information.

In the case of three streams, one of the determinants of Expression 6 can be further selected if the pre-coding matrices corresponding to the two streams is already selected. This is the same for the case of four or more streams.

An example of a maximum of four transmitting antennas was described, but description can be expanded using Expression 5 and Expression 6 even if the number of transmitting antennas is five or more.

Thus in the case of the present embodiment, where the terminal 20 transmits a relative value as the PMI, the number of transmitting bits is less compared with the case of transmitting the number of a code book(s) as the PMI. Therefore the terminal 20 can use the assigned frequency for transmitting other information, so frequency utilization efficiency can be improved.

The terminal 20 and the base station 10 use a pre-coding matrix which the terminal 20 specifies by a relative value based on the channel estimating value, instead of using a predetermined number of pre-coding matrices in the code book. Therefore the terminal 20 can receive data having good throughput characteristics matching for the propagation path environment.

Even if the number of streams changes from two to one by random adaptation, the terminal 20 can receive data with good throughput characteristics since the terminal 20 and the base station 10 use a pre-coding matrix where the column vectors are disposed from the left in the sequence of greater singular value. Even if the number of streams is changed from one to two, the number of parameters does not change, as mentioned above. Therefore the terminal 20 can specify a pre-coding matrix by a relative value, as mentioned above, and can improve frequency utilization efficiency.

Third Embodiment

The third embodiment will now be described. In the second embodiment, the relative PMI determining unit 25 determines a relative value, and updates the parameters of the pre-coding matrix being held in the matrix holding unit 24. In the third embodiment, the terminal 20 updates the parameters of the pre-coding matrix based on a control signal transmitted from the base station 10.

Figure 7:
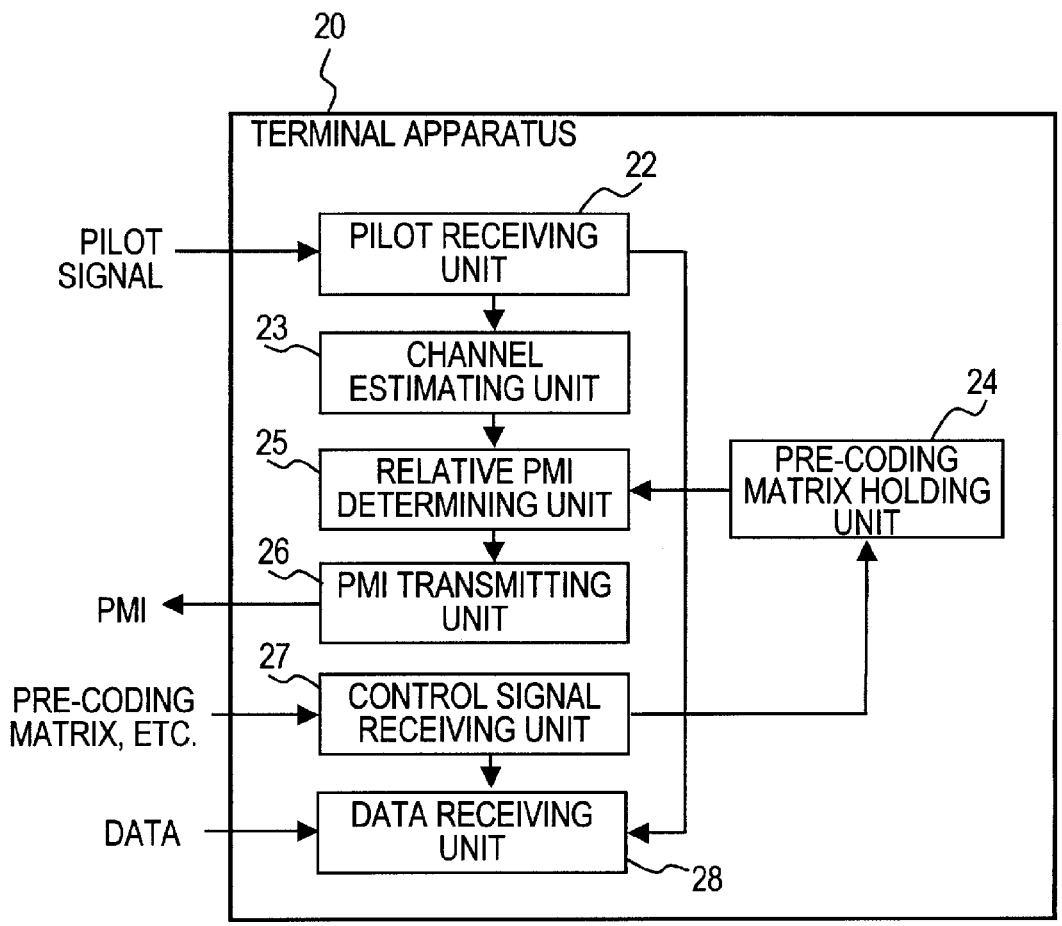
FIG. 7 illustrates another configuration example of a terminal apparatus.

FIG. 7 illustrates a configuration example of the terminal 20. A configuration example of the base station 10 is the same as the second embodiment (see FIG. 5). In this third embodiment, the relative PMI determining unit 25 does not update the parameters of the pre-coding matrix held in the matrix holding unit 24 even if the relative PMI value is determined, and the control signal receiving unit 27 updates the parameters based on the relative value included in the control signal.

In the case of this embodiment, the pre-coding matrix held in the matrix holding unit 24 is not updated after the terminal 20 transmits the relative PMI value until the control signal is received. During this time, the pre-coding matrix held in the matrix holding unit 24 is not updated, and the PMI transmitting unit 26 does not transmit a relative value (or the relative PMI determining unit 25 does not determine the relative value). The relative PMI determining unit 25 determines a relative value after the pre-coding matrix held in the matrix holding unit 24 is updated.

For example, this configuration is effective when the terminal 20 is moving at low speed where the propagation path does not change much. If the relative value of the terminal 20 is different from that of the base station 10, the control signal receiving unit 27 need not adjust the parameters, and updates the pre-coding matrix held in the matrix holding unit 24 using the relative value included in the received control signal. Therefore in the case of the third embodiment, compared with the second embodiment, processing of the terminal 20 can be more efficient. The terminal 20 does not transmit the PMI until the control signal is received, so the number of times of transmitting PMI decreases, and frequency utilization efficiency in the uplink direction can be improved. Since the updated pre-coding matrix is output from the control signal receiving unit 27, the data receiving unit 28 receives data using the updated pre-coding matrix.

Fourth Embodiment

The fourth embodiment will now be described. In this embodiment, the base station 10 transmits pre-coding information of an absolute value at a predetermined timing. The configuration example of the base station 10 and that of the terminal 20 are the same as the second embodiment (see FIG. 4 and FIG. 5).

Figure 8:
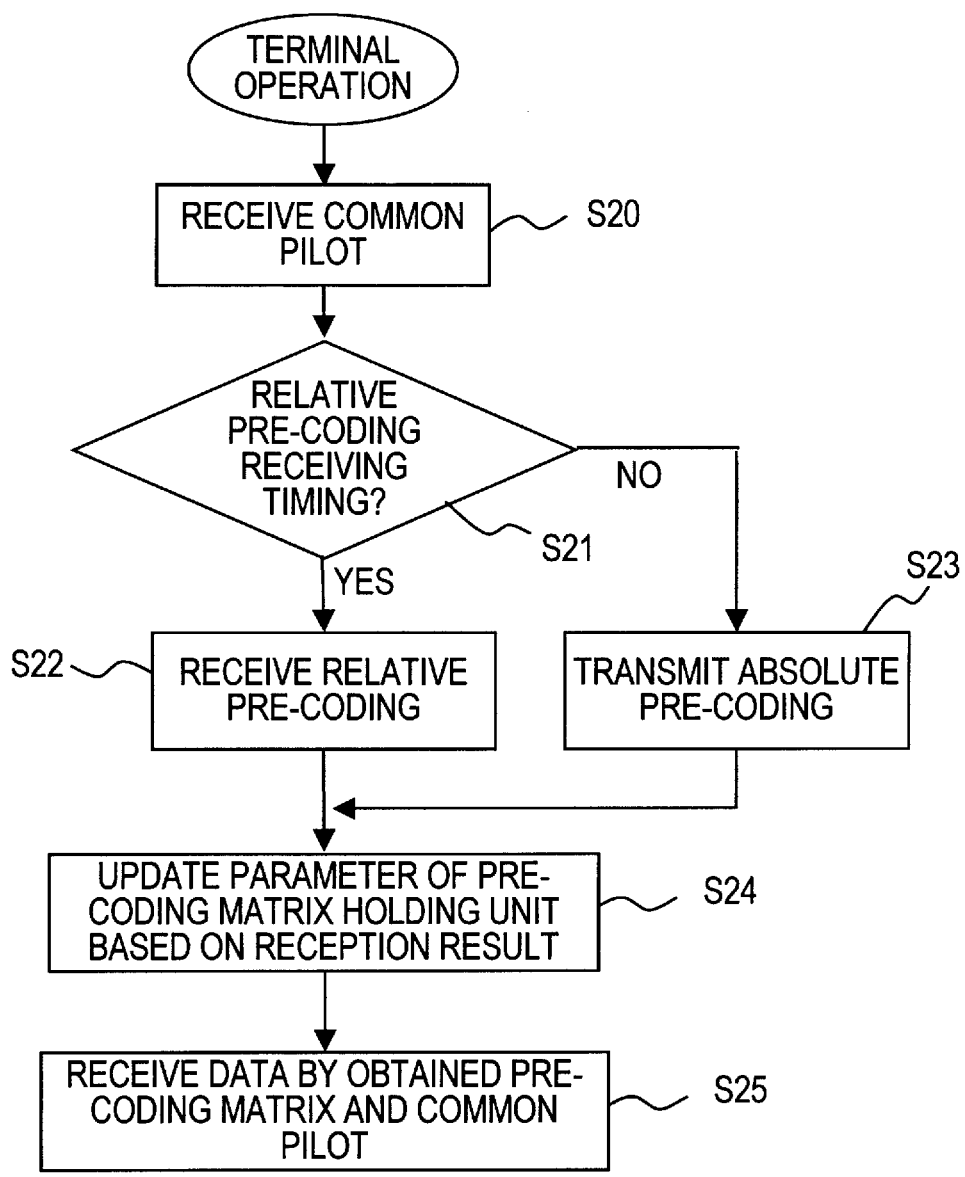
FIG. 8 is a flow chart illustrating an operation example in the terminal apparatus.
Figure 9:
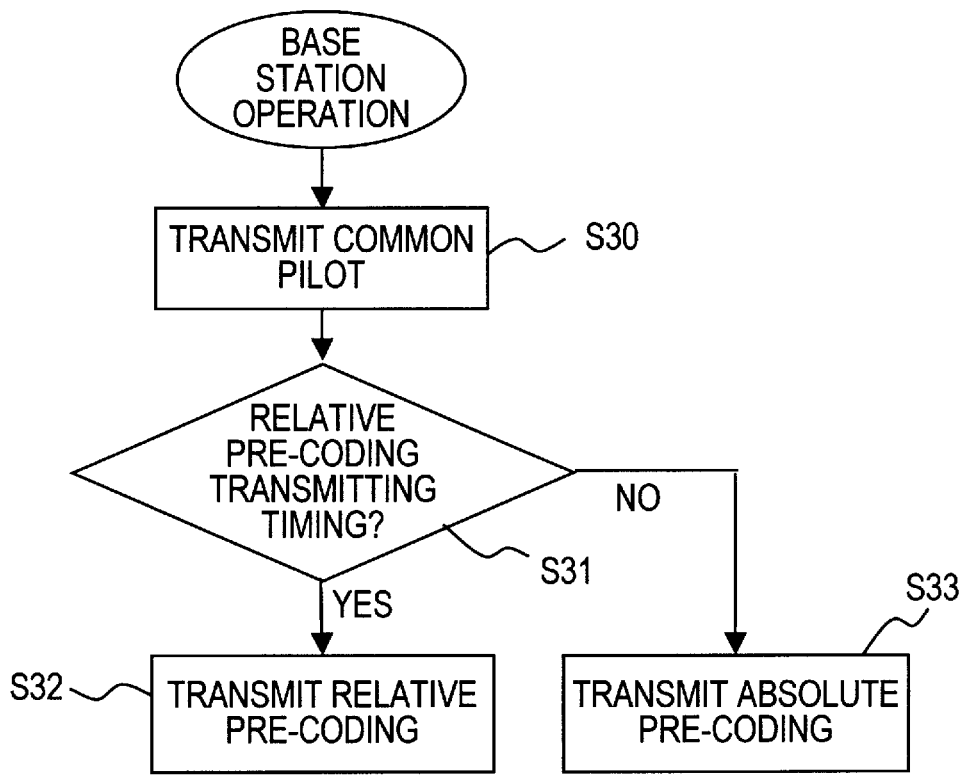
FIG. 9 is a flow chart illustrating an operation example in the base station apparatus.

FIG. 8 is a flow chart illustrating an operation example of the terminal 20, and FIG. 9 is that of the base station 10. As FIG. 8 illustrates, the terminal 20 receives a common pilot signal (S20), and receives an absolute pre-coding value included in the control signal (S23) if it is not a relative pre-coding receiving timing (NO in S21). The common pilot signal is received by the pilot receiving unit 22, and the control signal receiving unit 27, for example, determines whether it is a receiving timing or not.

If it is the relative pre-coding receiving timing (YES in S21), on the other hand, the terminal 20 receives a relative value included in the control signal (S22). The absolute pre-coding value and the relative pre-coding value are received by the control signal receiving unit 27, for example.

Then the control signal receiving unit 27 updates the parameter of the pre-coding matrix held in the matrix holding unit 24 based on the receiving result (S24).

Then the data receiving unit 28 receives data by the updated pre-coding matrix and the common pilot signal (S25).

As FIG. 9 illustrates, the base station 10 transmits the common pilot signal via the pilot transmitting unit 12 (S30).

Then the control signal transmitting unit 17, for example, determines whether it is the relative pre-coding transmitting timing or not, and transmits the absolute value of the parameter of the pre-coding matrix determined by the matrix determining unit 16 (S33) if it is not the transmitting timing (NO in S31).

If it is the transmitting timing (YES in S31), on the other hand, the control signal transmitting unit 17, for example, transmits the relative value of the parameter of the pre-coding matrix determined by the matrix determining unit 16 (S32).

In the case of LTE, for example, SFN (System Frame Number), which assigns a frame number at a 1024 frame cycle (one frame is 10 ms) is specified, and a timing (S21, S31) is determined by pre-determining that an absolute value is transmitted at a certain SFN.

Thus the terminal 20 can transmit an absolute value of the parameter of a pre-coding matrix at a certain timing, and periodically reset or correct the difference between a parameter of the pre-coding matrix held by the base station 10 and that held by the terminal 20.

Fifth Embodiment

The fifth embodiment will now be described. In this embodiment as well, a difference of parameter is periodically reset. The configuration example of the base station 10 and that of the terminal 20 are the same as the second embodiment (see FIG. 4 and FIG. 5).

Figure 10:
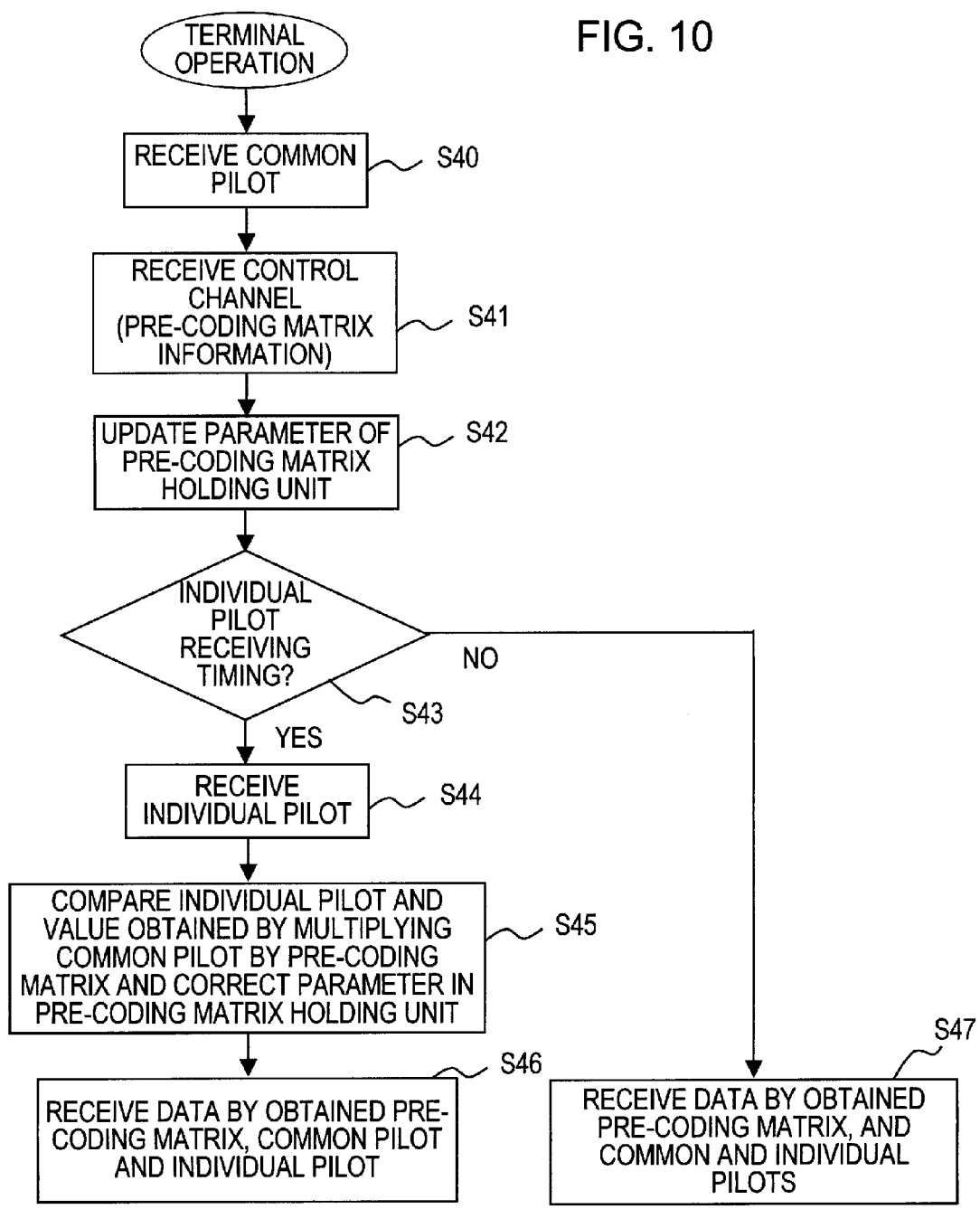
FIG. 10 is a flow chart illustrating another operation example in the terminal apparatus.
Figure 11:
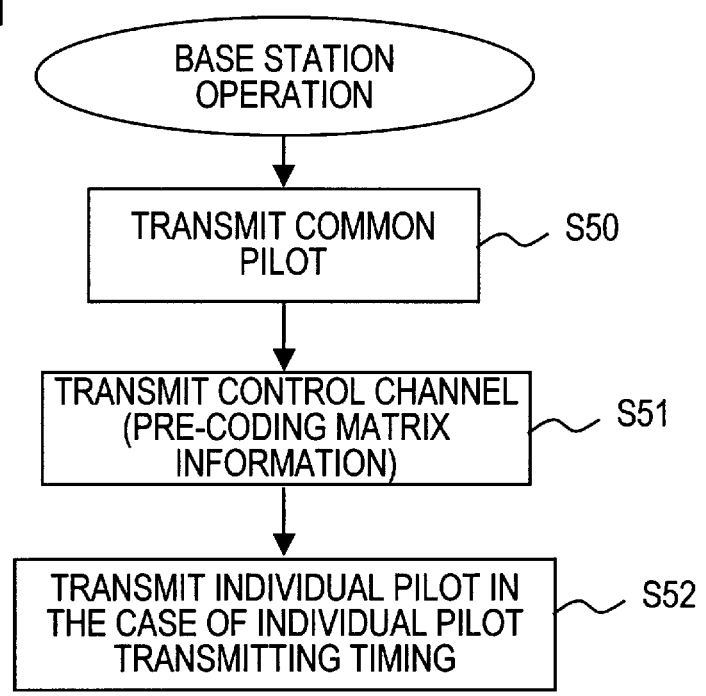
FIG. 11 is a flow chart illustrating another operation example in the base station apparatus.

FIG. 10 is a flow chart illustrating an operation example of the terminal 20, and FIG. 11 is that of the base station 10. As FIG. 10 illustrates, the pilot receiving unit 22 of the terminal 20 receives a common pilot signal (S40), and the control signal receiving unit 27 receives a control signal including a relative value (S41).

Then the control signal receiving unit 27 updates a parameter of a pre-coding matrix held in the matrix holding unit 24 based on the relative value (S42).

Then at an individual pilot signal receiving timing (YES in S43), the pilot receiving unit 22 receives an individual pilot signal (S44), and the control signal receiving unit 27 corrects the parameter of the pre-coding matrix if necessary (S45).

When an individual pilot signal is transmitted, the base station 10 transmits a data string, which is mapped to each transmitting antenna 11-1 to 11-$n$ using the pre-coding matrix, as the individual pilot signal. For example, the base station 10 combines the data strings using the mathematical expression illustrated in FIG. 13, and transmits the result as the individual pilot signal. When a common pilot signal is transmitted, on the other hand, the base station 10 transmits the common pilot signal without using the pre-coding matrix.

This means that in the case of a common pilot signal which does not use a pre-coding matrix, the terminal 20 combines the pre-coding matrix held in the matrix holding unit 24 of the terminal 20 itself with the common pilot signal (by using the expression in FIG. 13, for example), and compares whether the result matches with the originally combined individual pilot signal, whereby whether the pre-coding matrix held by the base station 10 and that held by the terminal 20 match, can be determined.

The terminal 20 does not correct parameters if the common pilot signal which the terminal 20 combined, and the individual pilot signal which the base station 10 combined, match, and corrects parameters if there is no match. For example, if the common pilot signal and the individual pilot signal do not match, the terminal 20 determines parameters with which the common pilot signal and the individual pilot signal match, or determines parameters closest to the individual pilot signal, and updates the parameters of the pre-coding matrix held by the matrix holding unit 24. These processings are performed by, for example, the control signal receiving unit 27, or the pilot receiving unit 22, or the relative PMI determining unit 25, or the data receiving unit 28.

Then the data receiving unit 28 receives data using the corrected parameters (S46).

If it is not the individual pilot signal receiving timing (NO in S43), on the other hand, the terminal 20 updates the pre-coding matrix of the matrix holding unit 24 by the relative value obtained in S41, and receives data by the data receiving unit 28 (S47).

As FIG. 11 illustrates, the base station 10 transmits the common pilot signal (S50), transmits the control signal including the relative value (S51), and transmits the individual pilot signal at an individual pilot signal transmitting timing (S52). The base station 10 transmits the common pilot signal without using the pre-coding matrix, and transmits the individual pilot signal using the pre-coding matrix. The processing to transmit the individual pilot signal using the pre-coding matrix is performed by the pilot transmitting unit 12, for example.

Sixth Embodiment

The sixth embodiment will now be described. In this embodiment, the change amount of the parameter of the pre-coding matrix is based on the moving speed of the terminal 20. For example, if the moving speed of the terminal 20 is fast, the change amount is also increased since the environment of the propagation path changes quickly, and if not, the change amount is decreased.

Figure 12:
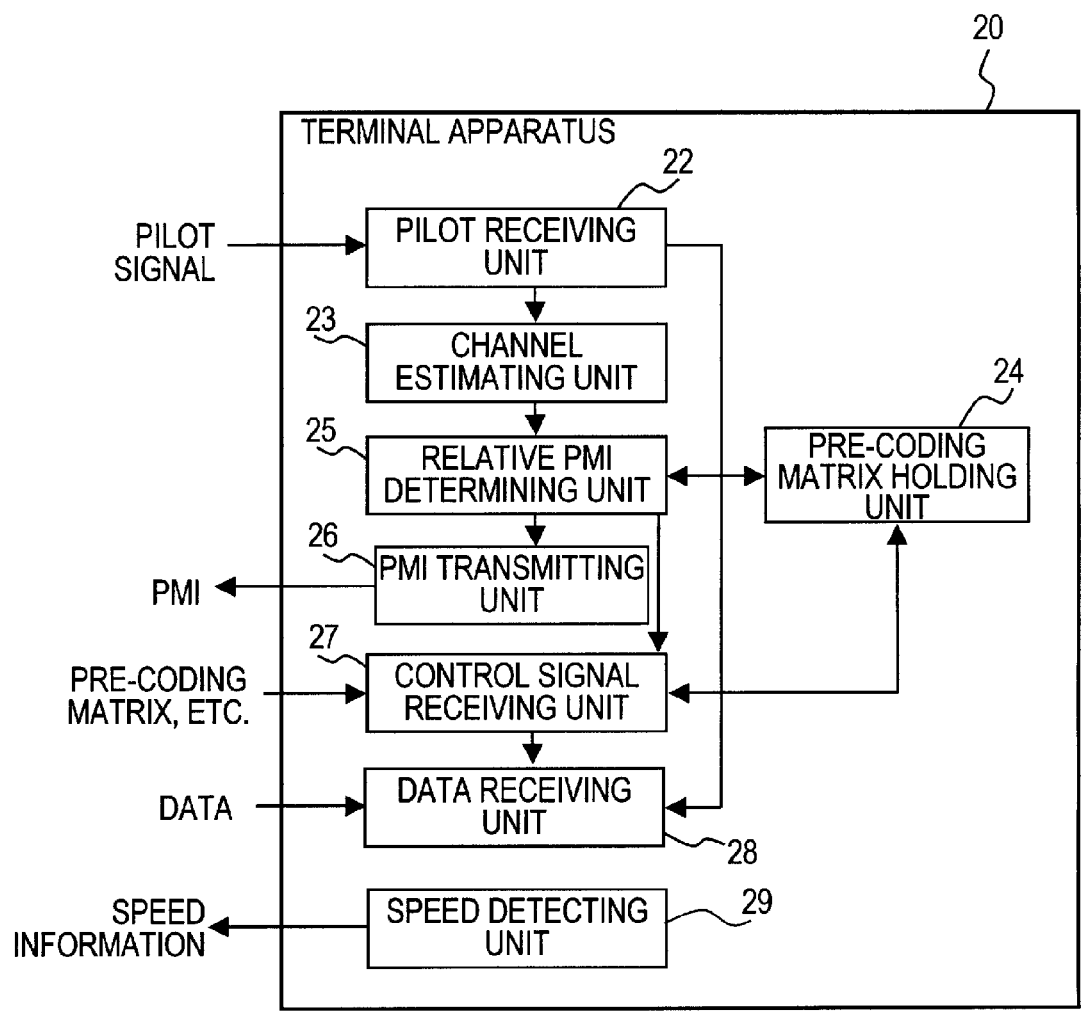
FIG. 12 illustrates another configuration of the terminal apparatus.
Figure 13:
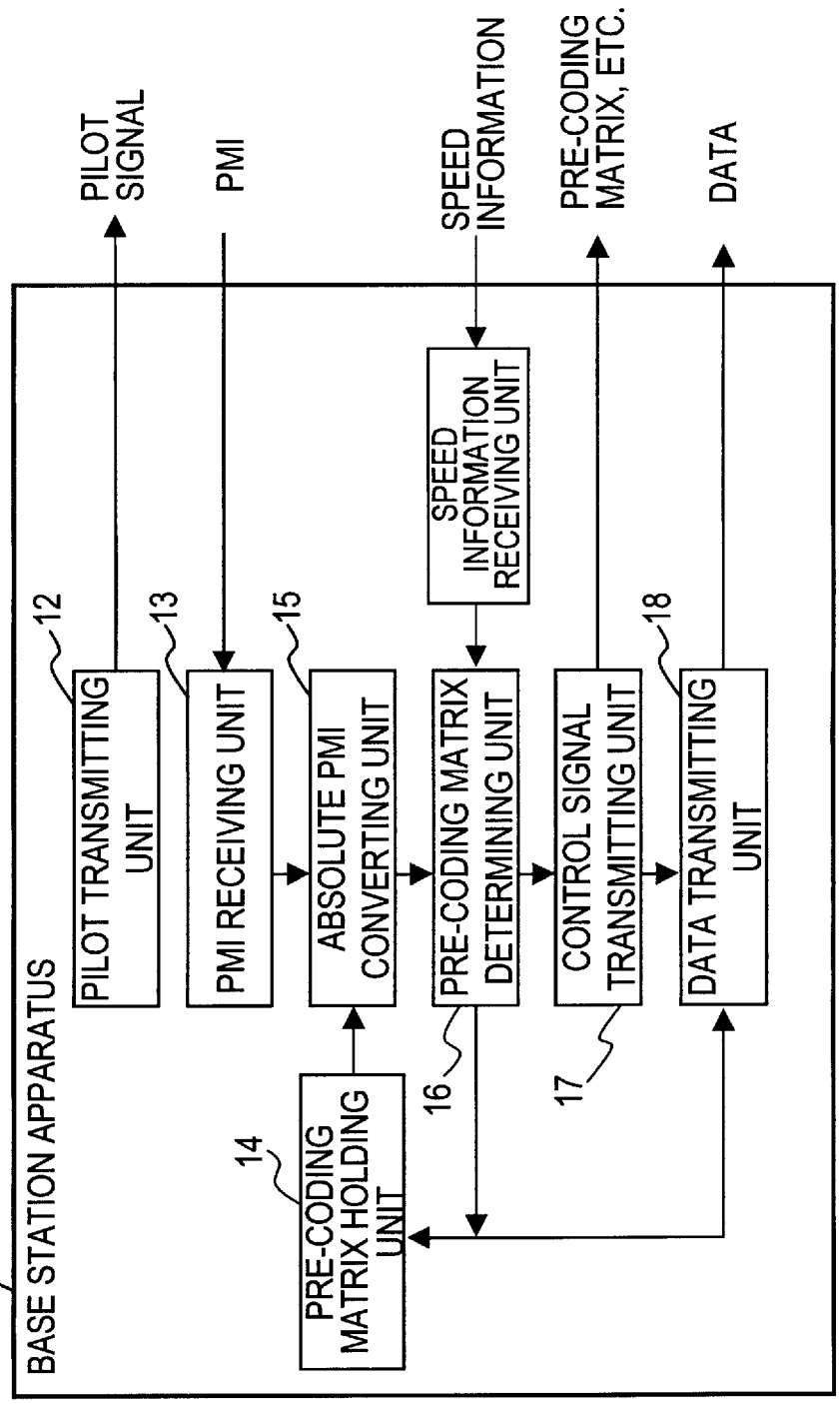
FIG. 13 illustrates another configuration of the base station apparatus.
Figure 14:
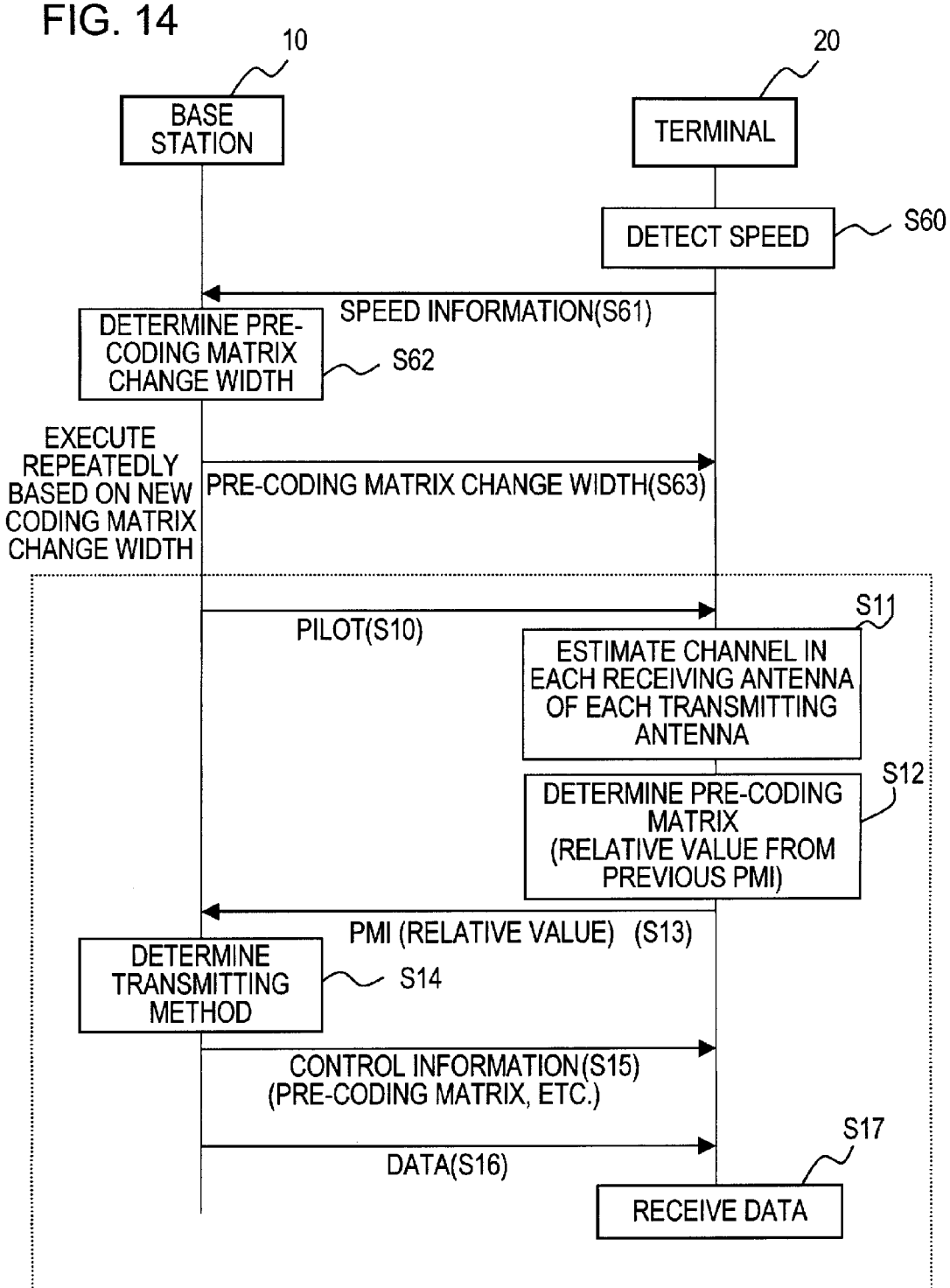
FIG. 14 is a sequence diagram illustrating another operation example in the radio communication system.

FIG. 12 illustrates a configuration example of the terminal 20 and FIG. 13 illustrates that of the base station 10, and FIG. 14 illustrates an operation example of the present embodiment.

As FIG. 12 illustrates, the terminal 20 further includes a speed detecting unit 29, and as FIG. 13 illustrated, the base station 10 further includes a speed information receiving unit 19.

The speed detection unit 29 detects the moving speed of the terminal 20, and transmits the moving speed information (S60). The speed information receiving unit 19, on the other hand, receives the moving speed information from the terminal 20, and outputs the received information to the matrix determining unit 16. The matrix determining unit 16 determines the change amount (or fluctuation width) of the parameter based on the moving velocity information (S62). The determined change amount is held by the matrix holding unit 14, for example, and the control signal transmitting unit 17 reads the change amount, and transmits it to the terminal 20 (S63).

For example, the control signal receiving unit 27 of the terminal 20 holds the change amount in the matrix holding unit 24, and the relative PMI determining unit 25 reads the change amount from the matrix holding unit 24, and determines a relative value based on this change amount (S10 to S17).

In the sixth embodiment, the change amount in the direction of moving the parameter of the pre-coding matrix is changed according to the environment of the propagation path. The change amount is notified to the terminal 20 by host signaling (S63) from the base station 10, and if the moving speed is fast, the terminal 20 increases the change amount because the change of the environment of the propagation path is also large, and decreases the change amount otherwise. Since a data string is transmitted from the base station 10 by an optimum pre-coding matrix matching the environment of the propagation path, the throughput characteristics in the downlink information further improve.

Other Embodiments

In all of the above embodiments, various MIMOs can be used. For example, a multi-user MIMO which assigns a plurality of users (or terminals 20) at the same time, or a network MIMO in which a plurality of cells are linked and perform MIMO, can be used.

In all of the above embodiments, a sub-band PMI, which applies a pre-coding matrix to a part of the frequency and feeds back the pre-coding matrix, or a wide band PMI, which feeds back the pre-coding matrix to the entire system, can be used.

The invention claimed is:

1. A radio communication system comprising:
a base station apparatus; and
a terminal apparatus, wherein
the base station apparatus and terminal apparatus perform radio communication,
the terminal apparatus includes:
a holding unit which holds a pre-coding matrix;
a relative value determining unit which determines a relative value with respect to a parameter included in the held pre-coding matrix; and
a transmitting unit which transmits the determined relative value, and
the base station apparatus includes a receiving unit which receives the relative value.

2. The radio communication system according to claim 1, wherein
the holding unit holds the pre-coding matrix as a mathematical expression including the parameter, and
the relative value determining unit determines as the relative value a changing direction of the parameter included in the mathematical expression.

3. The radio communication system according to claim 1, wherein
the base station apparatus further includes:
a plurality of transmitting antennas;
a matrix determining unit which determines a pre-coding matrix based on the received relative value;
a holding unit which holds the determined pre-coding matrix; and
a data transmitting unit which maps data to each of the transmitting antennas based on the determined pre-coding matrix, and transmits the data.

4. The radio communication system according to claim 1, wherein
the base station apparatus further includes a known signal transmitting unit which transmits a known signal,
the terminal apparatus further includes a channel estimating unit which estimates a channel based on the received known signal, and
the relative value determining unit determines the relative value based on a result of the channel estimating unit.

5. The radio communication system according to claim 1, wherein the transmitting unit does not transmit the relative value, when the relative value determining unit determines that there is no change in the parameter for the pre-coding matrix held in the holding unit.

6. The radio communication system according to claim 3, wherein
the base station apparatus further includes a control signal transmitting unit which transmits a control signal,
the matrix determining unit determines a relative value of the parameter of the determined pre-coding matrix with respect to a parameter of the pre-coding matrix held by the holding unit of the base station apparatus, and
the control signal transmitting unit transmits the control signal including the relative signal.

7. The radio communication system according to claim 6, wherein
the terminal apparatus further includes a control signal receiving unit which receives the control signal, and
the control signal receiving unit corrects the relative value determined by the relative value determining unit based on the relative value included in the control signal, when the relative value included in the control signal and the relative value determined by the relative value determining unit are different.

8. The radio communication system according to claim 1, wherein the relative value determining unit determines the relative value by using the pre-coding matrix held in the holding unit of the terminal apparatus, even when the number of streams of the data transmitted from the base station is changed.

9. The radio communication system according to claim 6, the matrix determining unit determines the relative value by using the pre-coding matrix held in the holding unit of the base station apparatus, and the data transmitting unit maps the data to each of the transmitting antennas based on the determined pre-coding matrix, even when the number of streams of the data transmitted from the base station is changed.

10. The radio communication system according to claim 6, wherein
the terminal apparatus further includes a control signal receiving unit which receives the control signal, and
the control signal receiving unit updates the parameter of the pre-coding matrix held by the holding unit of the terminal apparatus, based on the relative value included in the control signal.

11. The radio communication system according to claim 10, wherein the relative value determining unit determines the relative value after the parameter of the pre-coding matrix held in the holding unit of the terminal apparatus is updated.

12. The radio communication system according to claim 6, wherein
the control signal transmitting unit periodically transmits the control signal including the parameter of the pre-coding matrix held in the holding unit of the base station apparatus, and
the control signal receiving unit updates the parameter of the pre-coding matrix held in the holding unit of the terminal apparatus based on the parameter included in the received control signal.

13. The radio communication system according to claim 1, wherein
the base station apparatus further includes a known signal transmitting unit which transmits first known signal and second known signal,
the terminal apparatus further includes a known signal receiving unit which receives the first and second known signal, and
the relative value determining unit periodically updates the pre-coding matrix held in the holding unit of the terminal apparatus based on the first and second known signal.

14. The radio communication system according to claim 3, wherein
the terminal apparatus further includes a moving speed detecting unit which detects a moving speed of the terminal apparatus and transmits the moving speed, and a control signal receiving unit which receives a control signal, the base station apparatus further includes a moving speed receiving unit which receives the moving speed, and a control signal transmitting unit which transmits the control signal, the matrix determining unit changes a fluctuation width of the relative value based on the moving speed, the control signal transmitting unit transmits the control signal including the changed fluctuation width, and the control signal receiving unit receives the control signal, and the relative value determining unit determines the relative value based on the fluctuation width included in the control signal.

15. A base station apparatus for performing radio communication with a terminal apparatus, the base station apparatus comprising:

a receiving unit which receives from the terminal apparatus a relative value with respect to a parameter included in a pre-coding matrix held in the terminal apparatus.

16. A terminal apparatus for performing radio communication with a base station apparatus, the terminal apparatus comprising:

a holding unit which holds a pre-coding matrix;

a relative value determining unit which determines a relative value with respect to a parameter included in the held pre-coding matrix; and a transmitting unit which transmits the determined relative value to the base station apparatus.

17. A radio communication method in a base station apparatus for performing radio communication with a terminal apparatus, the method comprising:

receiving by a receiving unit from the terminal apparatus a relative value with respect to a parameter included in a pre-coding matrix held in the terminal apparatus.

18. A radio communication method in a terminal apparatus for performing radio communication with a base station apparatus, the method comprising:

holding by a holding unit a pre-coding matrix;

determining by a relative value determining unit a relative value with respect to a parameter included in the held pre-coding matrix; and transmitting by a transmitting unit the determined relative value to the base station apparatus.

19. A radio communication system comprising:

a base station apparatus; and a terminal apparatus, wherein the base station apparatus and terminal apparatus perform radio communication, the terminal apparatus includes:

a holding unit which holds a pre-coding matrix;

a determining unit which determines a changing direction of a parameter included in the held pre-coding matrix; and a transmitting unit which transmits the changing direction, and the base station apparatus includes a receiving unit which receives the changing direction.

* * * * *